United States Patent [19]

Toth

[11] Patent Number: 4,829,520
[45] Date of Patent: May 9, 1989

[54] IN-PLACE DIAGNOSABLE ELECTRONIC CIRCUIT BOARD

[75] Inventor: William H. Toth, Madison, N.J.

[73] Assignee: American Telephone and Telegraph Company, AT&T Bell Laboratories, Murray Hill, N.J.

[21] Appl. No.: 26,054

[22] Filed: Mar. 16, 1987

[51] Int. Cl.⁴ .............................................. G06F 11/00
[52] U.S. Cl. ........................................ 371/15; 371/29; 371/16
[58] Field of Search ......................... 371/15, 25, 16, 27, 371/17, 29, 18, 20, 23, 24; 364/200, 900

[56] References Cited

U.S. PATENT DOCUMENTS

| | | | |
|---|---|---|---|
| 4,434,489 | 2/1984 | Blyth | 371/29 |
| 4,578,773 | 3/1986 | Desai | 371/15 |
| 4,606,024 | 8/1986 | Glass | 371/18 |
| 4,633,466 | 12/1986 | Laws | 371/16 |
| 4,633,467 | 12/1986 | Abel | 371/16 |
| 4,688,222 | 8/1987 | Blum | 371/25 |
| 4,718,064 | 1/1988 | Edwards | 371/16 |
| 4,720,672 | 1/1988 | Turino | 371/27 |
| 4,726,024 | 2/1988 | Guziak | 371/16 |
| 4,727,545 | 2/1988 | Glackemeyer | 371/25 |
| 4,736,374 | 4/1988 | Kump | 371/29 |

Primary Examiner—Michael R. Fleming
Attorney, Agent, or Firm—Henry T. Brendzel

[57] ABSTRACT

An on-board self diagnostic capability is realized in a circuit board with a microprocessor which is located on the circuit board and which interacts for diagnostic purposes with the functional circuitry on the board. The microprocessor interacts with an electrically erasable read-only-memory (EEROM) that is also located on the circuit board. Diagnostic signals occurring during the circuit board's normal operation are automatically detected and stored in the EEROM. Additionally, a control port at the circuit board permits activation in the microprocessor of diagnostic routines that accept input test data, apply test sequences to the functional circuitry and store the diagnostic results in the EEROM. Also, through control of the microprocessor, the EEROM is accessed to retrieve previously stored diagnostic results.

13 Claims, 3 Drawing Sheets

IN-PLACE DIAGNOSABLE ELECTRONIC CIRCUIT BOARD

BACKGROUND OF THE INVENTION

This invention relates to fault diagnostics in electronic circuits. More particularly, this invention relates to methods and arrangements for communicating fault diagnostics to repair systems.

VLSI technology permits fairly complex subsystems to be packaged on removable, or pluggable, circuit packs. The cost of a circuit board increases with complexity, and complexity increases with advances in VLSI manufacturing technologies.

High circuit board costs make repair of failed circuit boards desirable, but the complexity that comes with VLSI makes field repair almost impossible. Consequently, many current system designs incorporate methods and hardware means for isolating faults to removable sub-assembly (e.g., a circuit board), and rely on a field technician to locate the failed sub-assemblies, replace them, and send the failed units to repair centers.

In some software-based systems, diagnostic software is also incorporated which is activated either automatically, or manually, and that software exercises the system and locates the faults to within the desired granularity. Typically, the desired granularity is the removable circuit board. In most of these applications, detailed diagnostic results are summarized into a pass/fail indication, and the indication is presented to the repair technician so that proper circuit board replacements can be effected. A failed circuit board is then removed and returned to the factory for repair, often with a written summary of the indications presented to the technician.

A number of limitations exist with the present techniques. First, detailed test results are not reliably and accurately returned with the circuit boards to the repair center. This relates to the practical problems of recording test indications accurately, loss or separation of the diagnostic record during transit of the failed circuit board, etc. Second, once the failed circuit board arrives at the repair center, repair must begin with the minimal information provided about the latest circuit board failure. Third, to proceed with repair, external equipment is required to invoke testing and obtain results, and there is some question whether the original failure can be induced again and identified.

SUMMARY OF THE INVENTION

In accordance with the principles of this invention, an on-board self diagnostic capability is realized in a circuit board with a microprocessor which is located on the circuit board and which interacts for diagnostic purposes with the functional circuitry on the board. The microprocessor interacts with an electrically erasable read-only-memory (EEROM) that is also located on the circuit board. Diagnostic signals occurring during the circuit board's normal operation are automatically detected and stored in the EEROM. Additionally, a control port at the circuit board permits activation in the microprocessor of diagnostic routines that accept input test data, apply test sequences to the functional circuitry and store the diagnostic results in the EEROM. Also, through control of the microprocessor, the EEROM is accessed to retrieve previously stored diagnostic results.

DETAILED DESCRIPTION

Figure 1:
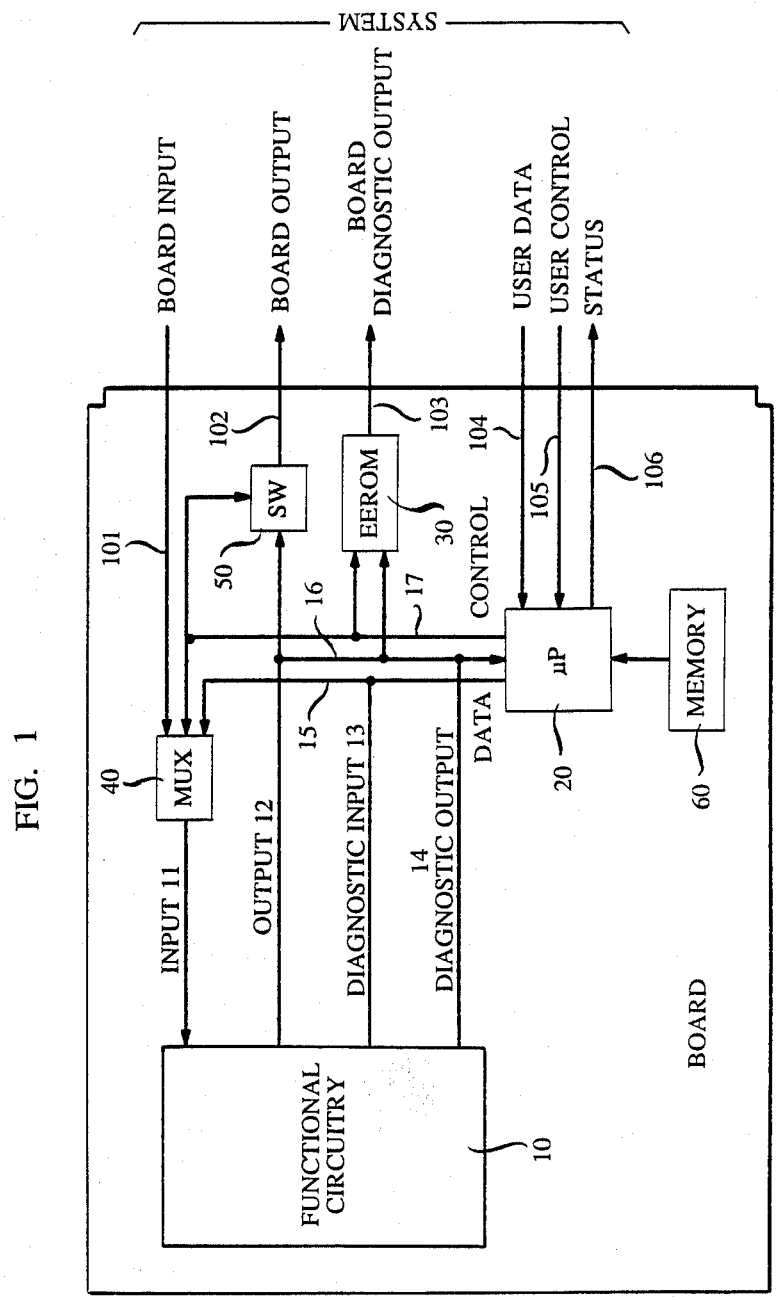
FIG. 1 illustrates a block diagram of circuitry on a pluggable board that affords the in situ diagnostics capabilities of this invention.

FIG. 1 depicts one realization of a plug-in board design in conformance with the principles of my invention. The primary elements in the FIG. 1 board design are the functional circuitry, 10, the on-board microprocessor, 20, and the on-board electrically erasable memory (EEROM), 30. The functional circuitry performs whatever function is desired of the board, and interfaces with the other elements or subsystems outside the board via board input leads 101 and board output leads 102. Leads 101 are connected to input leads 11 of circuitry 10 by way of two-input multiplexer 40, while leads 102 are connected to output leads 12 of circuitry 10 by way of switch 50. In addition to the functional input and output lead sets 11 and 12, the FIG. 1 arrangement includes additional leads going to and from circuitry 10; specifically, diagnostic input leads 13 and diagnostic output leads 14. Often, sufficient diagnostic information can be derived from a circuit simply by observing the signals at the normal output leads (12) and comparing them to the expected output signals. In other circuit designs, specific circuitry is provided for error detection, and the output signals of those circuits form diagnostic failure tagging outputs which, for example, trigger an alarm. In still other circuit designs, the electrical signals at various intermediate points within circuitry 10 may be particularly useful in pin-pointing failed components or subsystems, and those intermediate points are brought out through additional diagnostic output leads. It is the collection of these diagnostic leads that comprises leads 14 in FIG. 1, and those leads combine with output leads 12 to form data bus 16. Data bus 16 is applied to microprocessor 20 and to EEROM 30.

The expected output signals on bus 16 relate, of course, to the input signals applied to circuitry 10. In most designs, however, passive observation of the output signals is not sufficient to detect the occurrence of all possible malfunctions; and even if it were sufficient, detection of errors merely by observing output signals in response to the normally applied input signals would require microprocessor 20 to have very extensive computing and/or storage capabilities. Artisans generally overcome this problem by specifying various sets of diagnostic input signal sequences that "exercise" the circuitry in a predetermined manner and thereby uncover malfunctions efficiently. It is for this purpose that multiplexer 40 is included.

In FIG. 1, diagnostic sequences can be applied to circuitry 10 via input leads 11 or via diagnostic input leads 13. Input leads 11 receive signals either from bus 101 or from bus 15 (depending on the state of multiplexer 40), whereas diagnostic input leads 13 receive signals only from bus 15.

While diagnostic routines are being carried out, it may be desirable to not provide output signals at output leads 12. It is for this purpose that switch 50 is provided.

Both multiplexer 40 and switch 50 are controlled by microprocessor 20, via control bus 17.

To maintain a history of the diagnostic outputs, FIG. 1 provides for the storage of the diagnostic output signals of bus 16 in EEROM 30, in addition to these diagnostic signals being provided to microprocessor 20. EEROM 30 is a conventional, comemrcially available, unit. Writing into, and reading from EEROM 30 is controlled by microprocessor 20.

Microprocessor 20 is a conventional microprocessor with an associated memory 60 which comprises a read-only portion and a read-write portion. In FIG. 1, microprocessor 20 has a user data input 104, a user control input 105 and a status indication output 106. Status indication output 106 may be a multi-lead output that provides information to the system outside the board concerning the operational well-being, or state of the functional circuitry and of the microprocessor. User control input 105 permits the system outside the board to initiate selected routines to be performed by microprocessor 20 while user data input 104 permits data to be injected into microprocessor 20. Injection of data into microprocessor 20 may be useful in some of the diagnostic routines because it can initiate various registers, set different thresholds, and place the functional circuitry at any preselected state via buses 11 and 13. Being able to preset circuitry 10 to a preselected state substantially speeds up the diagnostic process. As an aside, the specific state applied to the functional circuitry 10 can also be obtained from memory 60 into which data may have been placed either by the designer (into the ROM portion) or by the capturing of a previous state of the system in the read-write portion of the memory.

Inputs 104 and 105 provide information to microprocessor 20 from the system outside the board. Bus 16, on the other hand, provides information to microprocessor 20 from within the board. As described above, bus 16 contains the normal output leads and the diagnostic output leads of circuitry 10. Consequently, microprocessor 20 can initiate diagnostic routines automatically in response to various preassigned states on bus 16, or following an analysis of signal sequences on bus 16 which may indicate the need for diagnostics. Based on its various inputs, microprocessor 20 also selects the outputs on bus 16 that are to be stored in EEROM 30.

Figure 2:
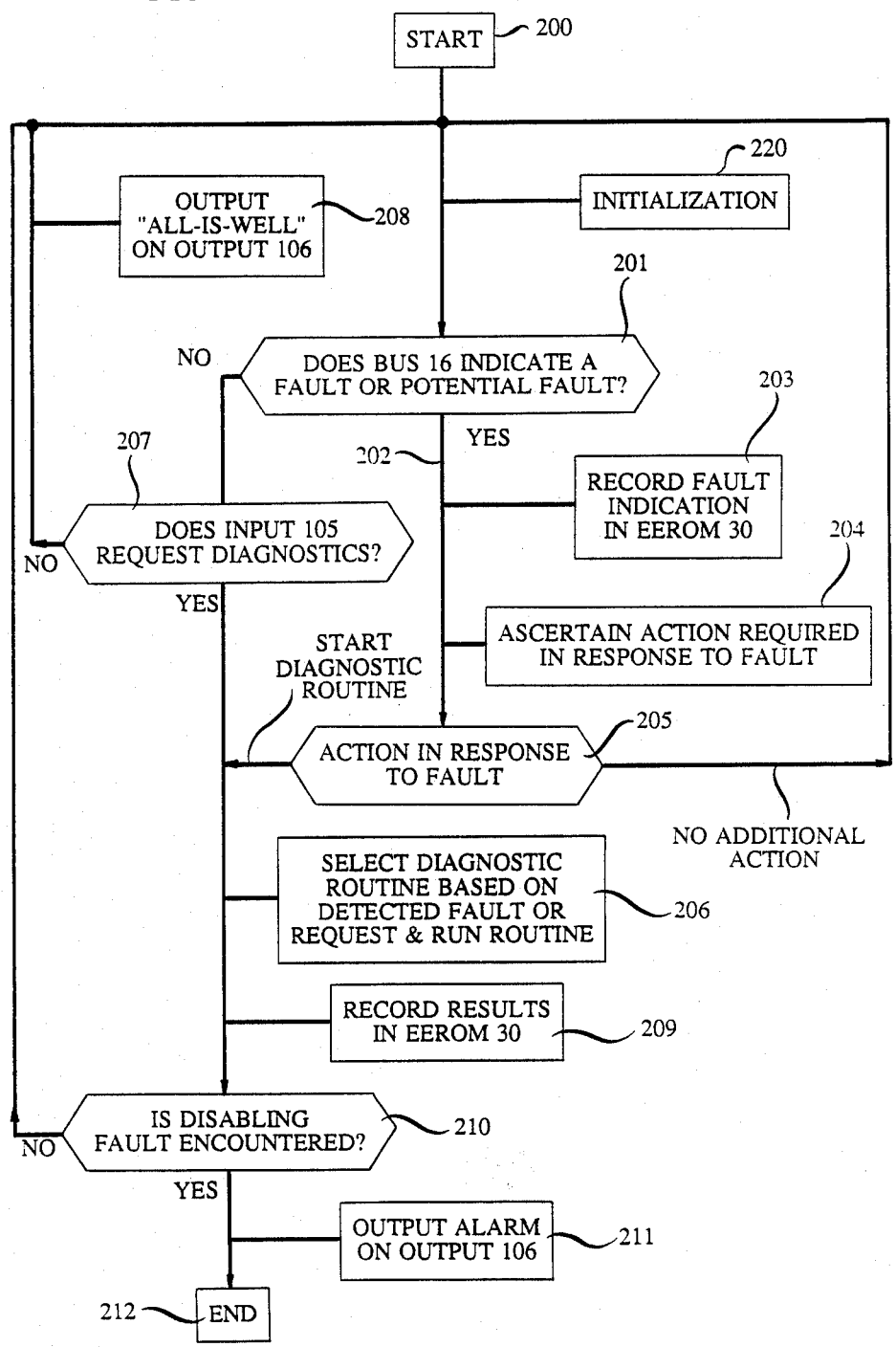
FIG. 2 presents a flow chart of the major processes in the microprocessor of FIG. 1.

FIG. 2 presents a flow diagram depicting the operation of microprocessor 20. Following START block 200, initializations are performed in block 220, and control passes to decision block 201, where a determination is made concerning the status on bus 16. When bus 16 indicates that a fault exists or that a potential fault may exist, control passes to path 202, the fault indication is recorded in EEROM 30 (block 203), and microprocessor 20 proceeds to ascertain the kind of action that is required in response to detected fault or potential fault (block 204). Sometimes the failure is not catastrophic and the design of the functional circuitry can compensate for the failure. In such cases, merely recording information concerning the failure (failure tagging) is sufficient. When no additional action is required (other than recording the fault) decision block 205 passes control back to decision block 201. When it is ascertained that a diagnostic routine is to be initiated, control passes to block 206.

When no faults are detected on bus 16 by decision block 201, control passes to decision block 207 where attention is directed to input 105. When input 105 does not request the initiation of diagnostic routines or outputting of data stored in EEROM 30, an "all is well" output is delivered to output leads 106 (block 208) and control returns to decision block 201. When input 105 does request the initiation of some routine, control again passes to block 206.

Block 206 is reached whenever a routine needs to be executed by microprocessor 20. The input requesting the diagnostics (be it input leads 105 or bus 16) also provides an indication as to the particular diagnostic routine that ought to be exercised. The selection of the diagnostic routine and the running of same is performed in block 206, with the results of the routine being recorded in EEROM 30 (block 209), if called for. Decision block 210 ascertains whether the encountered fault or the diagnostic results indicate that the subject board should be retired from service. When such is not the case, control returns to decision block 201. Otherwise, an alarm is presented to output 106 (block 211) and the microprocessor's operations are terminated by END block 212. When that happens, the failed board is removed from service and sent to the repair center.

Figure 3:
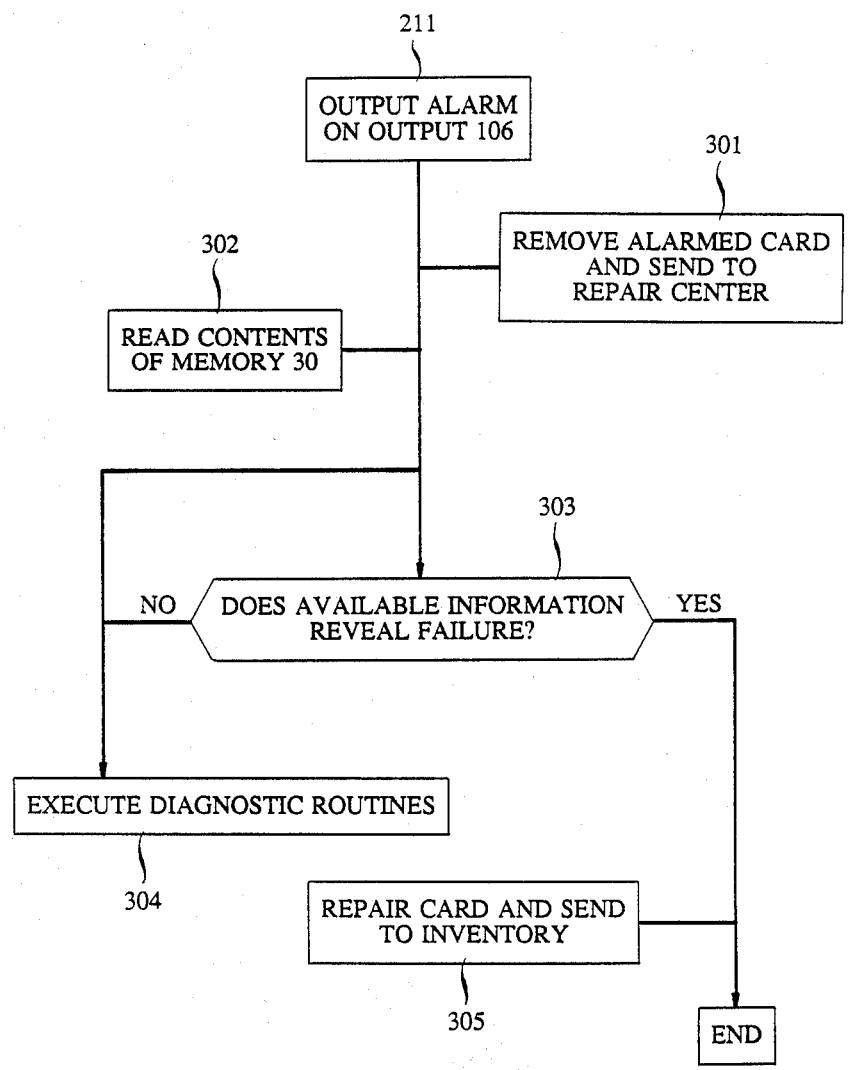
FIG. 3 presents a flow chart of operational sequences related to the maintenance of the pluggable circuit board.

As depicted in FIG. 3, in the repair center, the contents of EEROM 30 are accessed via control of microprocessor 20. Leads 104, 105 and 106 permit activating the microprocessor's routines, the routine can output the contents of EEROM 30 (block 302) and can exercise the functional circuitry with additional test sequences (block 304). With the aid of the available information the board can, hopefully, be repaired and forwarded for new service (block 305). Of course, as part of the repair, the EEROM would be erased in the manner specified by the EEROM's manufacturer.

The versatility of the structure depicted in FIG. 1 can be appreciated from a number of the very desirable features that I have implemented with this structure. One feature, for example, is a routine embedded in microprocessor 20 that detects the initiation of operations (e.g., when power is turned on). That routine is performed in block 220. Block 220 also initializes or configures the functional circuitry in accordance, for example, with the function that it must perform based on the specific location where it is inserted within the overall system. For instance, functional circuitry 10 may be a multi-pole Bessel filter, with the number of realized poles being controlled by microprocessor 20. In one location within the overall system, inputs 105 may specify a three pole realization, while at another location within the overall system, inputs 105 may specify a four pole realization. Such reconfiguring is easily accomplished within the routines of block 220.

Another feature, for example, is a storage integrity check. Since one of the primary benefits of my invention is the availability of stored diagnostic information, it is essential to protect this asset. The question arises, then, of what happens when EEROM 30 fails either partially or completely. Clearly there must be a procedure included that verifies the storage of information. In accordance with one aspect of my invention, each writing of data into EEROM 30 (e.g. in block 209) is effected by microprocessor 20 with a routine that reads the contents of EEROM 30 in the stored locations and compares that which has been stored with the information of which microprocessor 20 is aware. When the information storage is successful, there is a match and the routine exits normally. When there is no match, the routine tries to read again and, failing to successfully accomplish that task, the data is read into a different portion, or block, of EEROM 30. The rationale for that is the hope that the failure of EEROM 30 is only partial and that, therefore, the diagnostic information can still be saved.

The descriptions presented herein are illustrative of the principles of my invention, and it should be understood that variations in construction and embodiment can easily be incorporated in the FIG. 1 design without departing from the spirit and scope of this invention. For example, the disclosure herein describes the use of an electrically erasable read-only-memory (EEROM 30). The aspect of this memory that is critical to its operations in the context of this invention is its "read-only" feature, or, more specifically, the feature of read-only memories where contents of the memories remain unaltered by the removal of power. The erasable read-only-memory has the advantage of being reusable, but that is not critical. In appropriate circumstances, it may be economically feasible to employ a different memory that maintains its contents in the absence of power, or even to employ a conventional read-only memory (ROM) that may be written into by microprocessor 20 only once. After use at the repair center that ROM may be removed and replaced with another one. In the context of this disclosure, all versions of memory that can be used in the FIG. 1 arrangement and maintain their contents (without power external to the board) for a period of time that is sufficient to bring the board to a repair center and read the memory's contents, shall be encompassed by the term "robust memories".

What is claimed is:

1. A method for failure tagging of a removable electronic sub-assembly containing functional circuitry, means for testing said functional circuitry and a robust memory for storing results obtained by said means for testing, comprising the steps of:
    applying a test sequence stored in said means for testing to said functional circuitry in response to a stimulus applied to said means for testing;
    storing results obtained in response to said test sequence in a block of said robust memory located on said sub-assembly.

2. The method of claim 1 wherein said stimulus occurs when power is applied to said sub-assembly, when a fault is detected by elements within said functional circuitry, or when a test request signal is applied to said sub-assembly.

3. The method of claim 1, further comprising a step of reading the contents of said robust memory after said step of storing, and performing an integrity check on the information stored in said robust memory by said step of storing.

4. The method of claim 3, further comprising a step of storing said results in another block of said robust memory when said step of performing integrity check indicates that said step of storing, previous to said step of performing an integrity check, has failed.

5. A method for maintaining operational integrity of an electronic system containing a plurality of removable sub-assemblies, each sub-assembly containing functional circuitry, means for testing said functional circuitry, and a robust memory for storing results obtained by said means for testing, comprising the steps of:
    detecting via said means for testing, fault conditions in said functional circuitry;
    storing via said means for testing, indications of said fault conditions in said robust memory located on said sub-assembly;
    identifying via said means for testing, from said fault conditions the occurrence of conditions requiring repair of a failed sub-assembly in said system; and
    reading the contents of said robust memory situated on said failed sub-assembly to locate the cause of failure of said sub-assembly.

6. The method of claim 5, further comprising the steps of repairing said failed sub-assembly and recasting the robust memory situated on said failed sub-assembly into a content-less state.

7. A circuit assembly for performing a preselected function comprising
    first means for performing said preselected function;
    second means, responsive to an applied stimulus, for developing a test sequence and applying said test sequence to said first means; and
    robust memory means for storing selected signals of said first means that occur in response to said test sequence.

8. The circuit assembly of claim 7 further comprising means for reading the contents of said robust memory means.

9. The circuit assembly of claim 7 wherein said second means comprises:
    processor memory means for storing said test sequence;
    input/output means for accepting test requests; and
    processor means for performing tests in response to said test requests by applying said test sequence stored in said processor memory means to said first means and by storing said selected signals in said robust memory means.

10. The circuit assembly of claim 9 wherein said processor means reads the contents of said robust memory means and applies said contents to said input/output means.

11. The circuit assembly of claim 7 wherein said second means comprises:
    input/output means for accepting test requests; and
    processor means responsive to said test requests for developing said test sequence, applying said test sequence to said first means, and storing said selected signals in said robust memory means.

12. The circuit of claim 11 wherein said test sequence is a function of said selected signals.

13. A method for maintaining operational integrity of an electronic system containing a plurality of removable sub-assemblies, each sub-assembly containing functional circuitry, means for testing said functional circuitry, and a robust memory for storing results obtained by said means for testing, comprising the steps of:
    applying a test sequence stored in said means to said functional circuitry for testing in response to a stimulus applied to said means for testing;
    storing said results obtained in response to said test sequence in said robust memory;
    identifying from said step of applying a test sequence the occurrence of conditions requiring repair of a failed sub-assembly in said system; and
    removing said failed sub-assembly from said system and reading the contents of said EEROM situated on said failed sub-assembly to locate the cause of failure of said sub-assembly.

* * * * *